United States Patent
Namikawa et al.

(10) Patent No.: US 7,321,446 B2
(45) Date of Patent: Jan. 22, 2008

(54) COLOR IMAGE PROCESSING DEVICE AND COLOR IMAGE PROCESSING METHOD

(75) Inventors: Hirofumi Namikawa, Kameoka (JP); Katsushi Mimamino, Kyoto (JP)

(73) Assignee: Murata Kikai Kabushiki Kaisha, Kyoto (JP)

(*) Notice: Subject to any disclaimer, the term of this patent is extended or adjusted under 35 U.S.C. 154(b) by 1039 days.

(21) Appl. No.: 10/624,407

(22) Filed: Jul. 21, 2003

(65) Prior Publication Data

US 2004/0036930 A1  Feb. 26, 2004

(30) Foreign Application Priority Data

Aug. 6, 2002  (JP) ............... 2002-228313

(51) Int. Cl.
  *G06F 15/00* (2006.01)

(52) U.S. Cl. .................. 358/1.9; 358/448; 358/451; 355/233; 355/18

(58) Field of Classification Search .............. 358/1.9, 358/448, 451, 474; 355/233, 18
See application file for complete search history.

(56) References Cited

U.S. PATENT DOCUMENTS

| | | | | |
|---|---|---|---|---|
| 5,066,987 A | * | 11/1991 | Minefuji et al. | 399/207 |
| 5,771,104 A | * | 6/1998 | Sakano | 358/451 |
| 6,972,879 B2 | * | 12/2005 | Ide | 358/514 |
| 2003/0123033 A1 | * | 7/2003 | Megawa et al. | 355/18 |

FOREIGN PATENT DOCUMENTS

| | | |
|---|---|---|
| JP | 2578448 | 11/1996 |
| JP | 2656026 | 5/1997 |

\* cited by examiner

*Primary Examiner*—Kimberly Williams
*Assistant Examiner*—Michael Burleson
(74) *Attorney, Agent, or Firm*—Hogan & Hartson LLP

(57) ABSTRACT

A color image processing device includes n line sensors which are arranged with a prescribed interval L between one another, an image signal output unit which outputs image signals under a prescribed cycle from the line sensors and a line memory which stores the image signals for a plurality of lines and outputs the image signals with a delay. A control unit is provided for controlling to input one of the image signals of a certain cycle into the line memory, and to output an image signal from the line memory by delaying a certain number of lines, in accordance with a prescribed rate of magnification N.

18 Claims, 10 Drawing Sheets

50% (REDUCTION)

COLOR IMAGE PROCESSING DEVICE AND COLOR IMAGE PROCESSING METHOD

BACKGROUND OF THE INVENTION

1. Field of the Invention

The present invention relates to a color image processing device such as a color scanner, and a color image processing method used in the color image processing device.

2. Description of the Related Art

Color scanners are provided with line image sensors which are respectively formed from a charge coupled device (CCD) for each of the colors, red (R), green (G), and blue (B), wherein the line image sensors are provided in parallel to one another and displaced slightly from one another in a sub scanning direction. In this type of color scanner, since the line image sensors for each of the colors are provided in parallel to one another, the line image sensors cannot physically scan each of the colors on the same line of an original document at the same time. Therefore, a conventional color scanner includes a line memory which delays image data, and by maintaining a delay amount according to a rate of magnification, the color scanner extracts image data from the line memory, and arranges the image data of R, G, B scanned from a line on the same original document. However, according to the rate of magnification, there are cases when the color scanner cannot support image data just by the delay amount of the line. Therefore, there is a technology being proposed to change the time for starting a main scanning operation in accordance with the rate of magnification.

As described above, if the delay amount of the line is changed, and the time for starting the main scanning operation is also changed, the color scanner can support various rates of magnification. However, there is a problem that the circuitry for an image processing device becomes extremely complicated.

SUMMARY OF THE INVENTION

An advantage of the present invention is to provide a color image processing device which can enlarge or reduce an image under an arbitrary rate of magnification at a low cost, without enlarging the size of the circuitry.

According to a first aspect of the present invention, a color image processing device includes n line sensors (line image sensors) arranged with a prescribed interval L between one another, an image data output unit which outputs image data from the line sensors under a prescribed cycle, and a line memory which stores image data for a plurality of lines and outputs the image data with a delay.

According to a second aspect of the present invention, when P is an interval between pixels in a sub scanning direction during a scanning operation using 100% magnification, the number of pixels which increases and decreases by the rate of magnification is calculated by N·L/P. Then, it is determined which cycle is to be selected in accordance with a decimal part d of the calculated number, and a number of delayed lines is determined in accordance with an integral part D. A determination for selecting a cycle and the number of delayed lines can be made by a simple calculation.

According to a third aspect of the present invention, the color image processing device further includes a table of the decimal part d and the selected cycle. Therefore, a determination for selecting a cycle can be made easily in accordance with the calculation and by referring to the table.

DETAILED DESCRIPTION OF THE PREFERRED EMBODIMENTS

Figure 1:
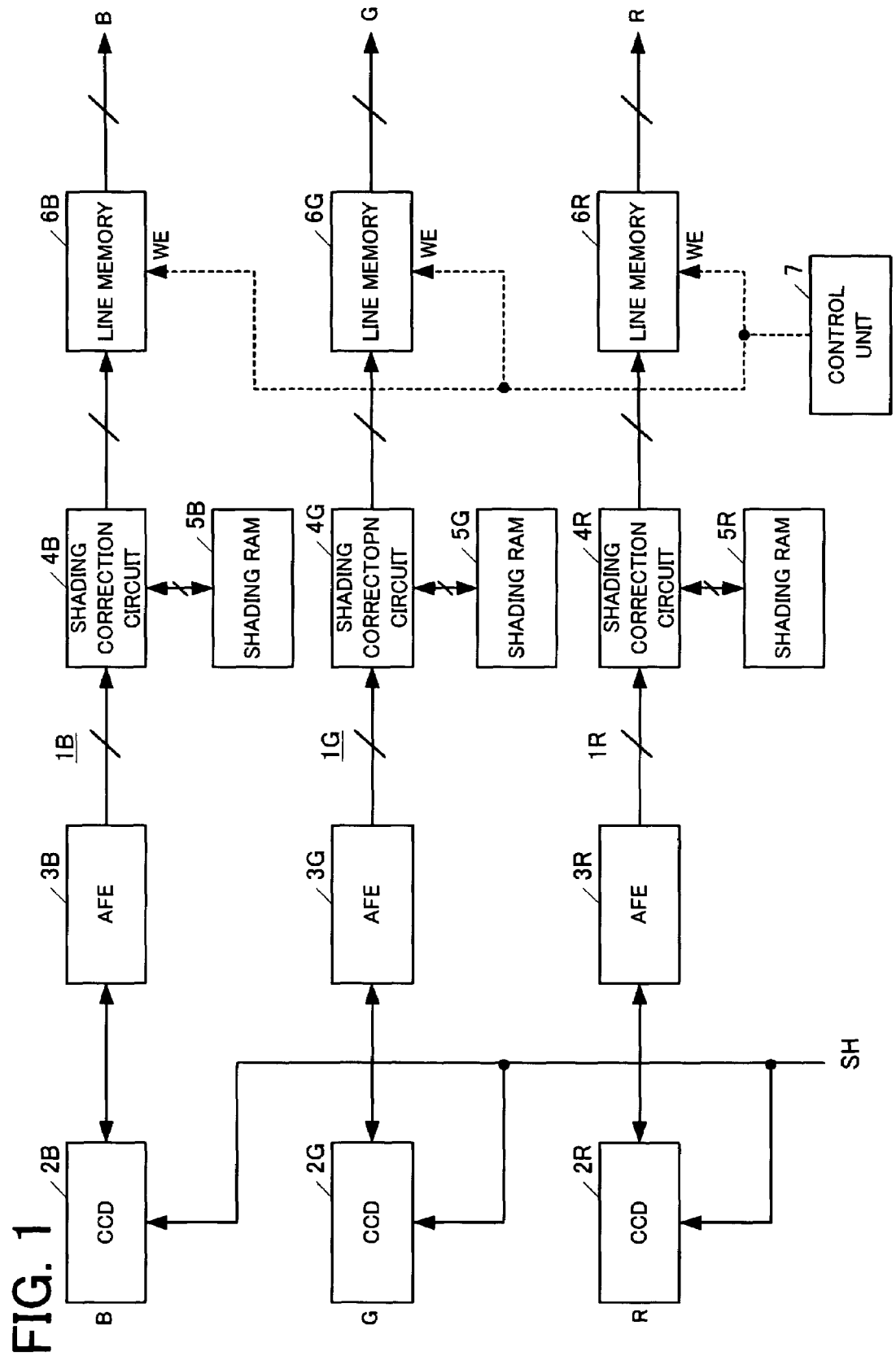
FIG. 1 is a block diagram showing a configuration of a color image scanning device according to an embodiment of the present invention.

Embodiments of the present invention will be described in detail with reference to the accompanying drawings. FIG. 1 is a block diagram showing relevant parts of a color image scanning device which is an embodiment of the present invention. The color image scanning device includes a B signal processing unit 1B, a G signal processing unit 1G, an R signal processing unit 1R, and a control unit 7.

The B signal processing unit 1B includes a line image sensor 2B, an Analog Front End (AFE) circuit 3B, a shading correction circuit 4B, a shading Random Access Memory (RAM) 5B, and a line memory 6B. The G signal processing unit 1G includes a line image sensor 2G, an AFE circuit 3G, a shading correction circuit 4G, a shading RAM 5G, and a line memory 6G. The R signal processing unit 1R also includes a circuit like the B signal processing unit 1B and the G signal processing unit 1G. That is, the R signal processing unit 1R includes an AFE circuit 3R, a shading correction circuit 4R, a shading RAM 5R, and a line memory 6R.

Figure 2:
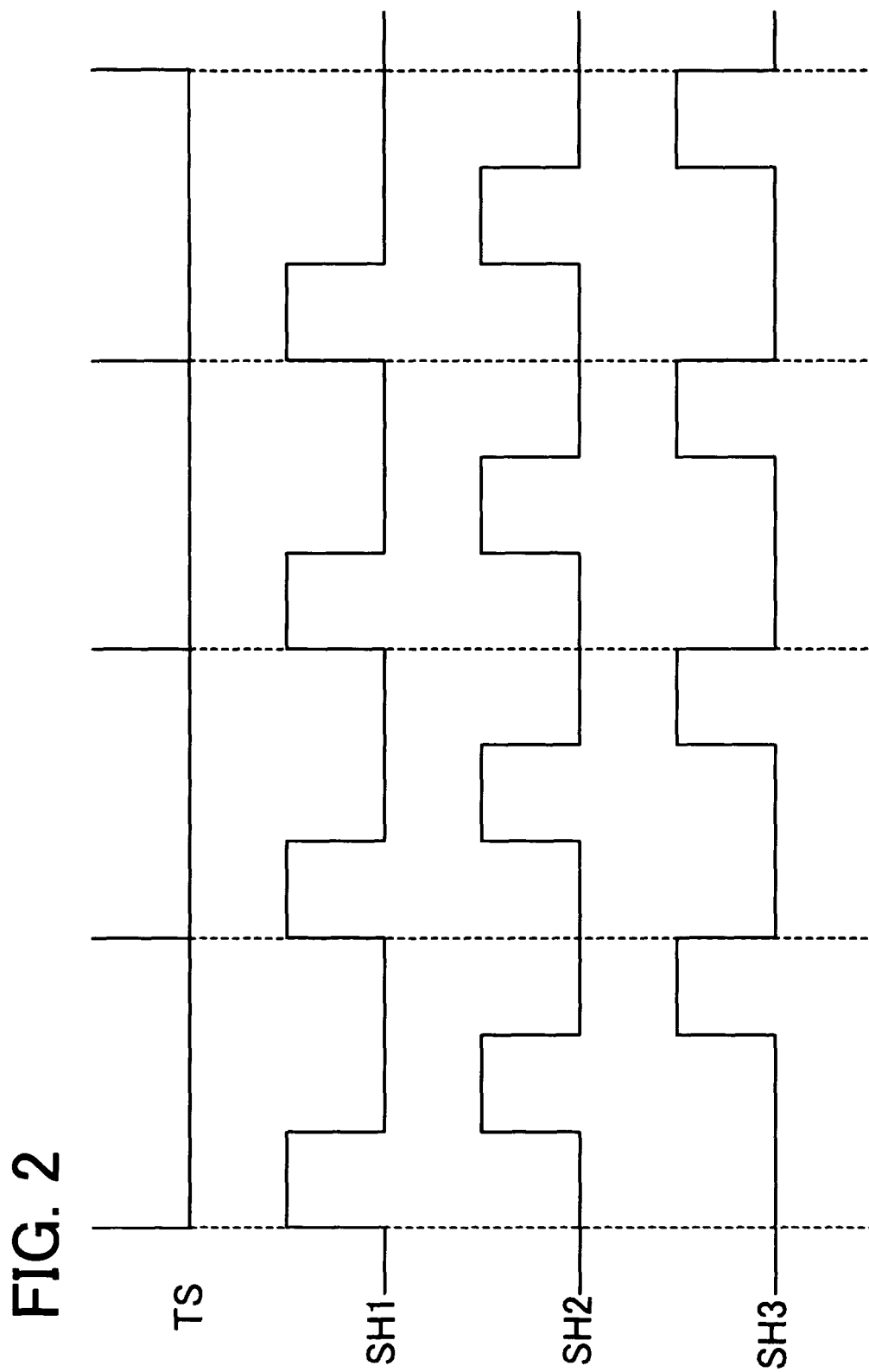
FIG. 2 is a time chart showing scanning timing signals of the color image scanning device of the embodiment.

The line image sensor 2B separates and reads B signal from an image of one scanning line of a color original document each time a timing signal TS shown in FIG. 2 is applied. The line image sensor 2B is driven for each of three timings, SH1, SH2, SH3, which are divided from a cycle of the scanning timing signal TS shown in FIG. 2. Then, the line image sensor 2B outputs image data of a scanned one line. The AFE circuit 3B amplifies an analog image signal which is output from the line image sensor 2B. Moreover, the AFE circuit 3B includes an analog to digital converter (not shown in the drawings). The AFE circuit 3B converts the analog image signal into digital data, and outputs the converted digital data as multi-value digital image data. Further, in the present embodiment, the cycle of the timing signal is divided into three timings. However, the present invention is not limit to this example, and the cycle can be divided differently.

For performing shading corrections, the shading RAM 5B stores an output of the AFE circuit 3B when the line image sensor 2B scans a white reference and a black reference. In the shading correction circuit 4B, the output of the AFE circuit 3B at a scanning operation of an original document is corrected by shading corrected data by the data for shading correction stored in the shading RAM 5B. Then, the shading correction circuit 4B outputs the shading corrected data. The data output from the shading correction circuit 4B is stored into the line memory 6B by a write enable signal WE transmitted from the control unit 7. Then, the stored data is output sequentially.

The write enable signal WE is input to the line memory 6B during any one of the timings SH1, SH2, SH3 divided from the cycle of the scanning timing signal TS shown in FIG. 2. The control unit 7 determines a timing to be selected from the timings SH1, SH2, SH3 in accordance with a value calculated based on the rate of magnification.

Figure 4:
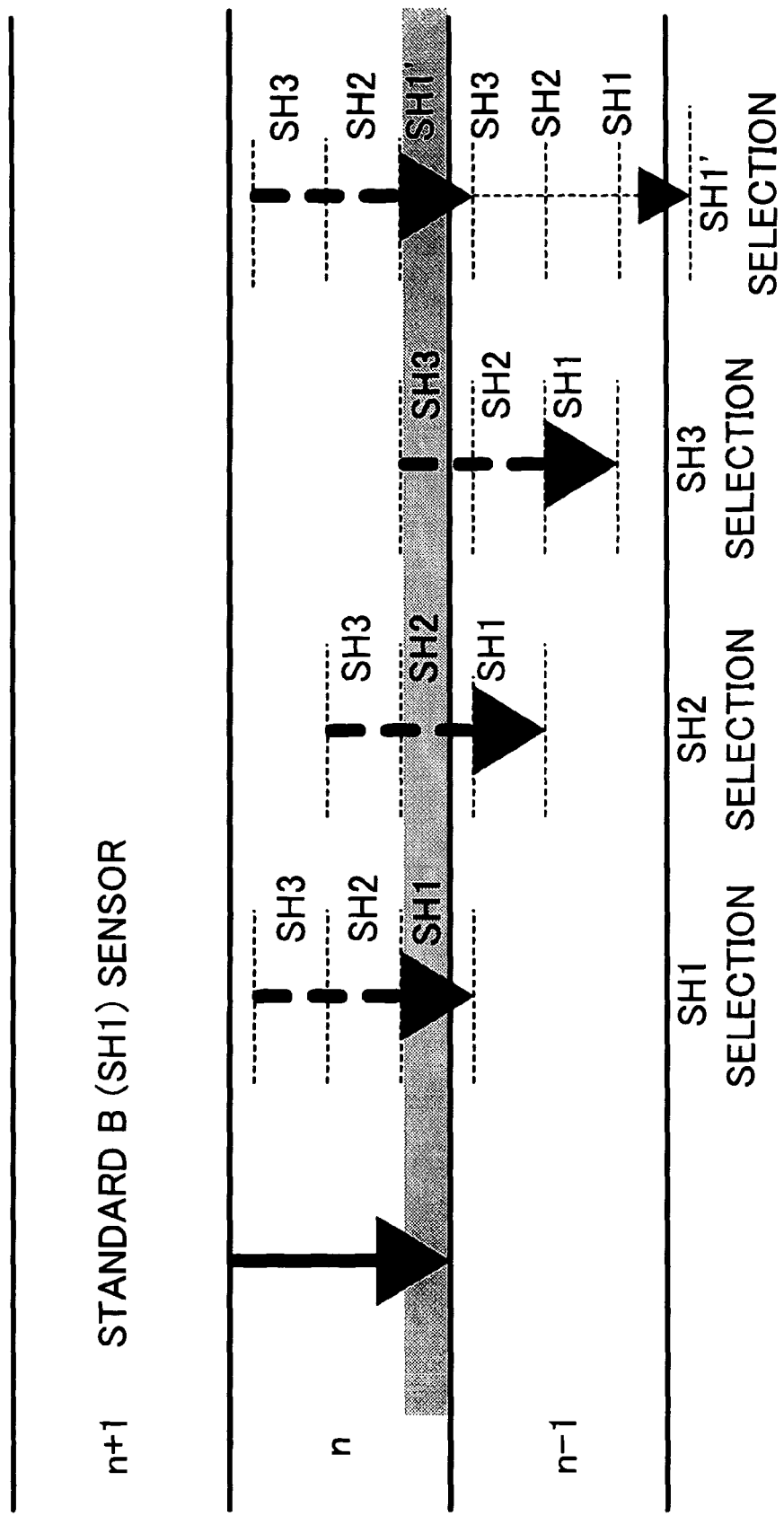
FIG. 4 is a schematic diagram showing a selection of a timing SH in the color image scanning device of the embodiment.

FIG. 4 shows a state in which the line image sensor 2B is a standard, and the timing of the selection progresses from SH1 to SH2, SH3, SH1'.

The line image sensor 2G separates and reads G signal from the image of one scanning line of a color original document each time the timing signal TS is applied. The line image sensor 2R separates and reads the R signal from the image of one scanning line of a color original document each time the timing signal TS is applied. The line image sensors 2G, 2R are also driven for a timing selected from the timings SH1, SH2, SH3, and the line image sensor 2G, 2R output an image signal of the scanned line. The AFE circuits 3G, 3R, the shading correction circuits 4G, 4R, the shading RAM 5G, 5R and the line memories 6G, 6R are respectively the same circuit as the AFE circuit 3B, the shading correction circuit 4B, the shading RAM 5B, and the line memory 6B. The timing under which the line memories 6G, 6R output the write enable signal WE is determined by the control unit 7 in accordance with each rate of magnification.

The line memories 6B, 6G, 6R output data under a timing considering a delay amount for a correcting gap of the line image sensors 2B, 2G, 2R, and an amount the position in a sub scanning line direction is corrected by the rate of magnification.

The line correction and the position correction on the sub scanning line for the line image sensors 2B, 2G, 2R in the color image scanning device of the present embodiment will be described with reference to FIG. 3.

To carry out the line correction and the position correction on the sub scanning line, first, a number of pixels N*m which increases and decreases by the rate of magnification is calculated.

N: rate of magnification (=1/transferred distance at enlargement or reduction)

m: =L/P

L: distance between the line image sensors R-B (number of gap lines between the line image sensors R-B)

P: pixel pitch in the sub scanning direction at equal magnification (1 line)

T: interval of pixels scanned

When calculating N*m=D.d, a number of delayed line can be determined from an integral part D, and the timings SH1, SH2, SH3, SH1' can be determined from a decimal part d.

SH1 is the timing to write data scanned by the line image sensor 2B into the line memory 6B. With SH1 as the standard, the timing (SH) is determined. Further, the timing (SH) is the timing to write into the line memories 6G, 6R, the data scanned by the line image sensors 2G, 2R which corresponds to a position the same as a position of an original document scanned by the line image sensor 2B.

The timing SH is determined under the following conditions by the decimal part d of the result D.d calculated from N*m.

SH1: $0 \leq d < 1/6$

SH2: $1/6 \leq d < 3/6$

SH3: $3/6 \leq d < 5/6$

SH1': $5/6 \leq d < 1$

A look up table for calculating N*m, and a look up table for determining the timing SH from the decimal part d are provided in the control unit 7. The control unit 7 calculates "N*m=D.d", and a number of delayed lines according to the rate of magnification of the line image scanner, and the correction in the sub scanning direction (optimum timing SH) are selected to realize each correction.

Figure 3:
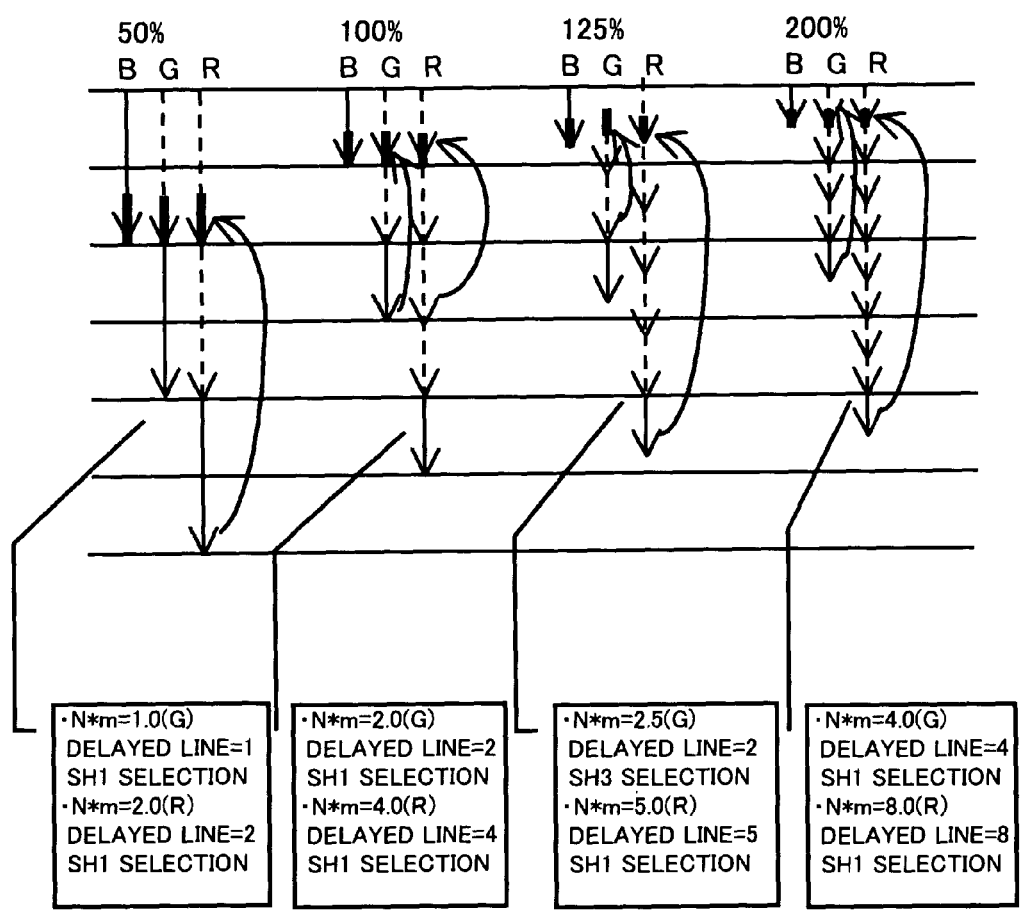
FIG. 3 is a schematic diagram showing line corrections and sub scanning position corrections of 1 Gap and a line image sensor in the color image scanning device of the embodiment.

For example, in FIG. 3, when the number of lines between the line image sensors R-B is 4, and the number of lines between the line image sensors G-B is 2, and the rate of magnification is 100%, between the line image sensors R-B, the number of pixels equals N*m=1.00*4/1=4.0, and (R-B) D(integral part)=4, d(decimal part)=0.

Moreover, between the line image sensors G-B, it becomes N*m=1.00*2/1=2.0, and (G-B)D(integral part)=2, d(decimal part)=0.

Figure 5:
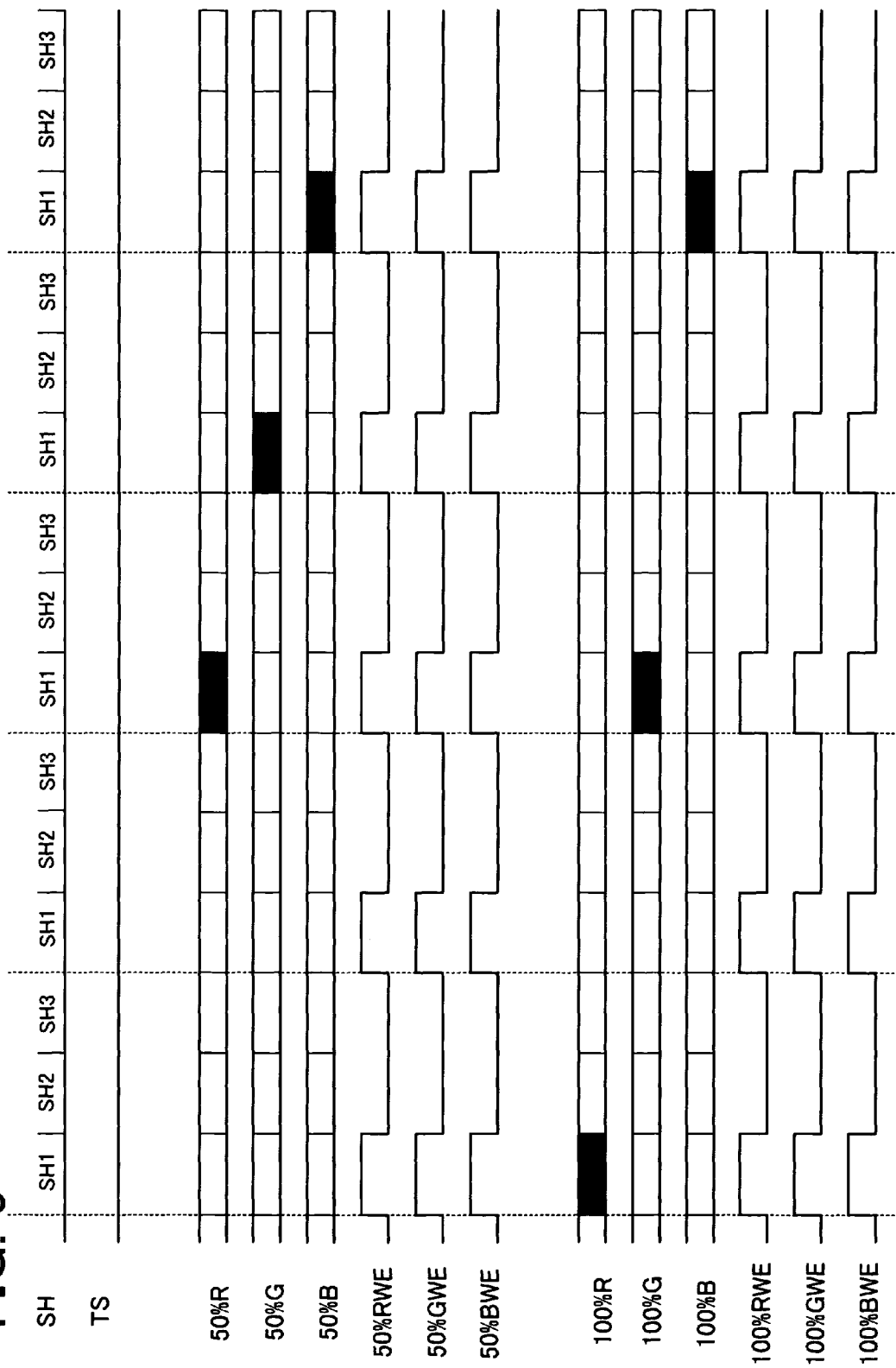
FIG. 5 is a time chart showing a line delay and a scanning timing when a rate of magnification is 50%, 100% in the color image scanning device of the embodiment.

In this case, since it is 100% magnification, as shown in FIG. 5, in relation to the line image sensor 2B, the data scanned by the line image sensor 2R can be delayed by four lines, and the data scanned by the line image sensor 2G can be delayed by two lines. A correction of the position in the sub scanning direction is not necessary.

Next, when the number of lines between the line image sensors is the same, and the rate of magnification is 125%, between the line image sensors R-B, the number of pixels equals N*m=1.25*4/1=5.0, and (R-B)D(integral part)=5, and d(decimal part)=0.

Moreover, between the line image sensors G-B, the number of pixels equals N*m=1.25*2/1=2.5, and (G-B)(integral part)=2, and d(decimal part)=0.5.

Figure 6:
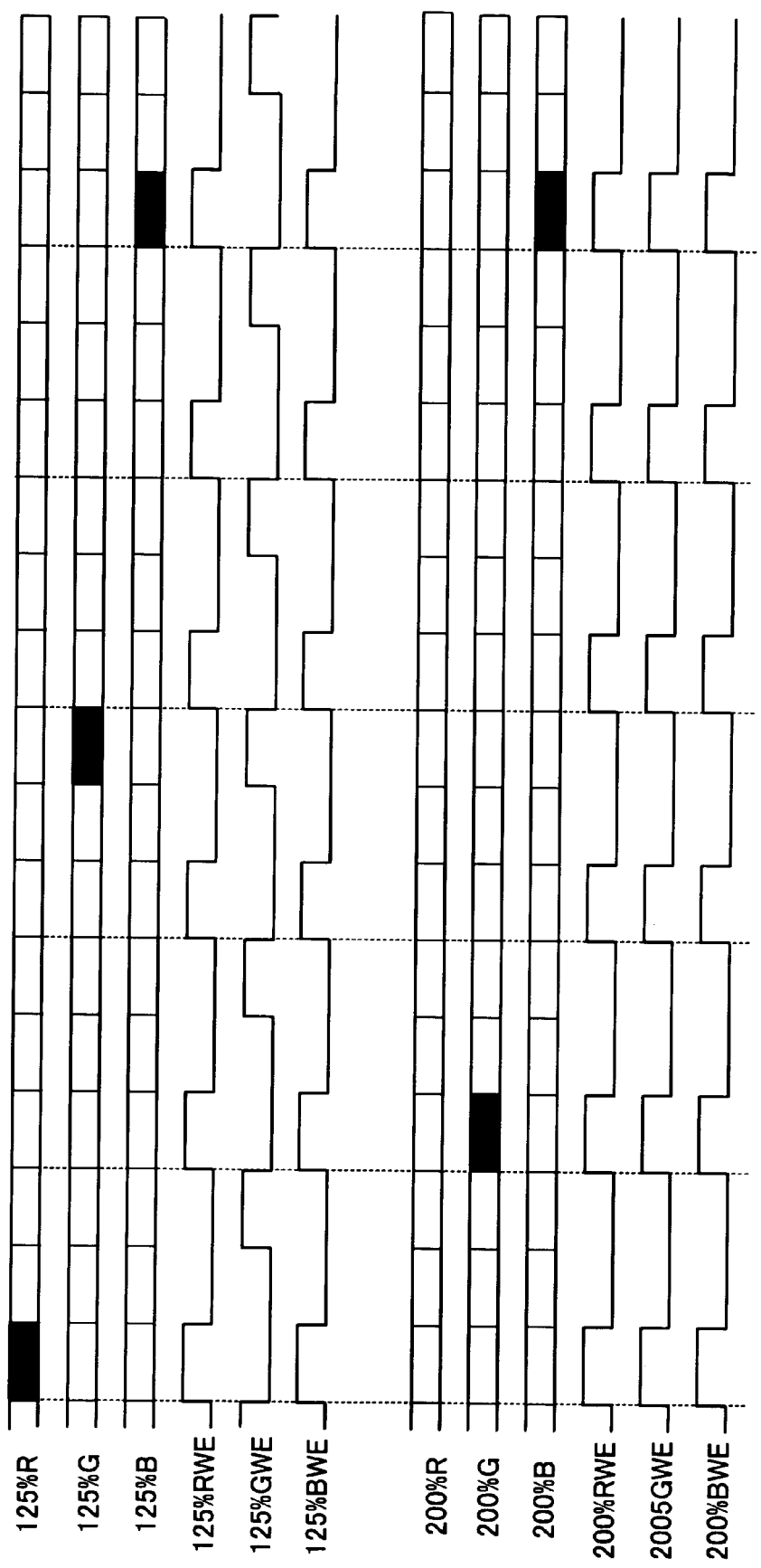
FIG. 6 is a time chart showing a line delay and a scanning timing when a rate of magnification is 125%, 200% in the color image scanning device of the embodiment.
Figure 7:
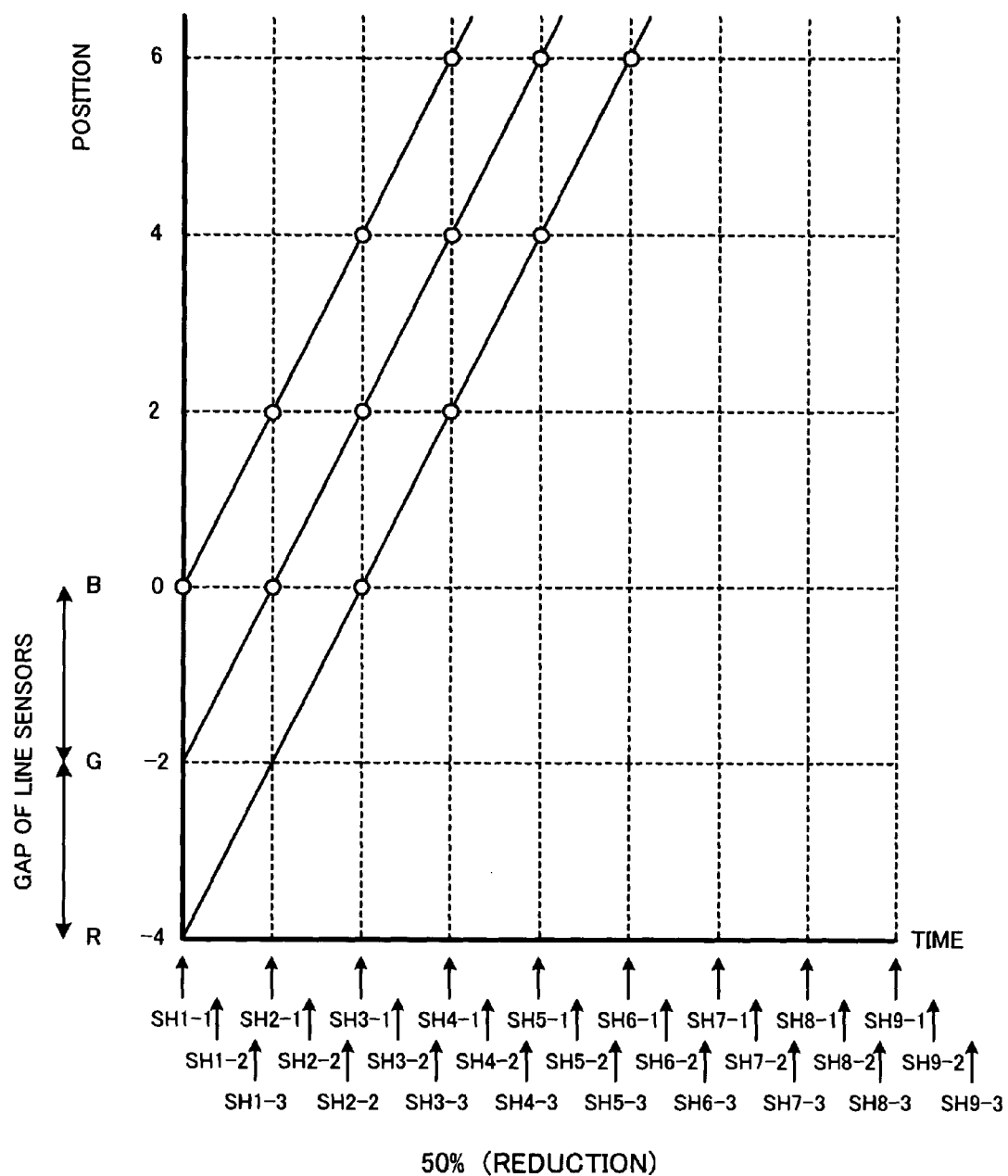
FIG. 7 is a graph showing a relationship between an elapse of time and a position of the line image sensor of when the rate of magnification is 50% in the color image scanning device.
Figure 8:
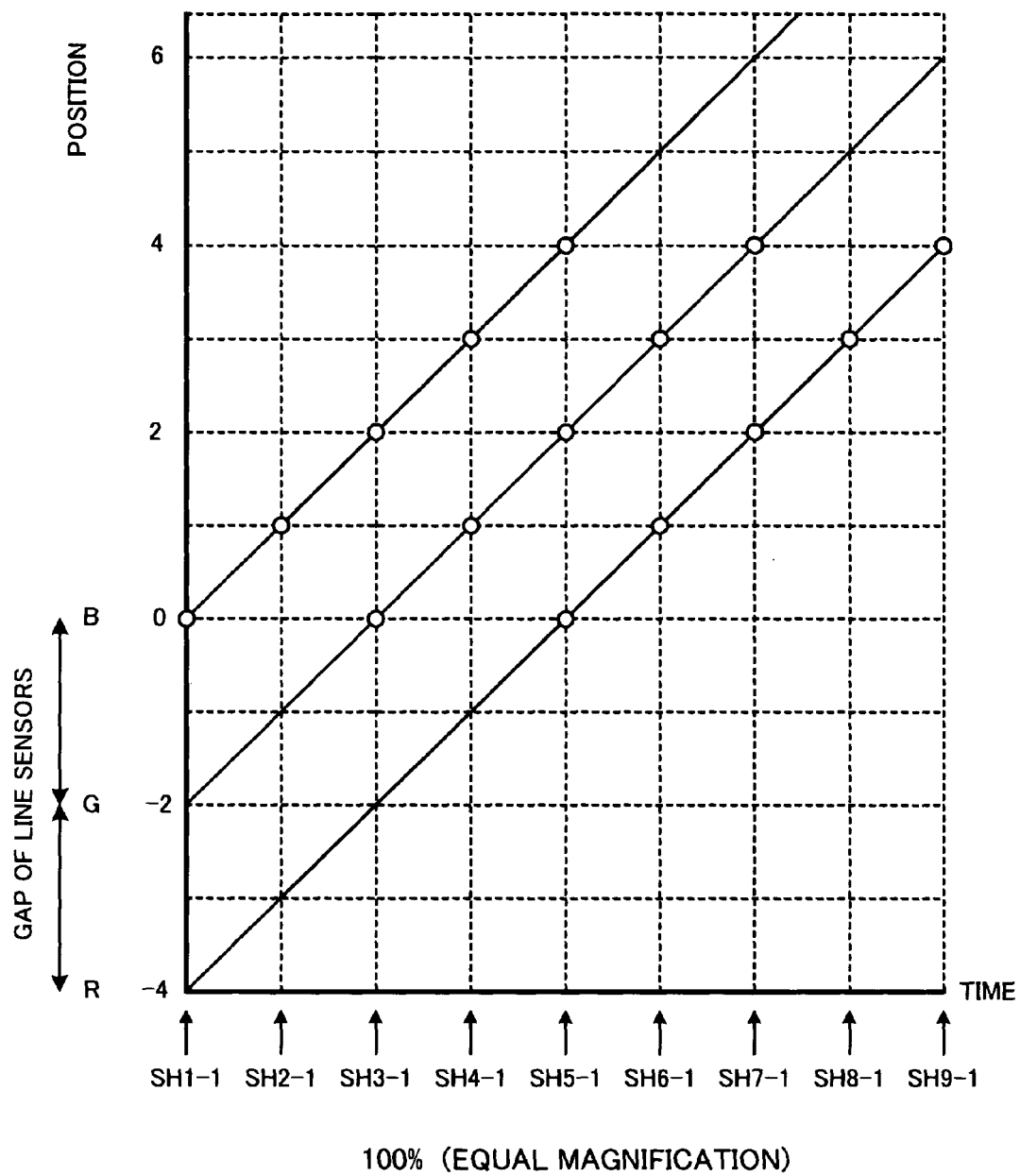
FIG. 8 is a graph showing a relationship between an elapse of time and a position of the line image sensor of when the rate of magnification is 100% in the color image scanning device.
Figure 9:
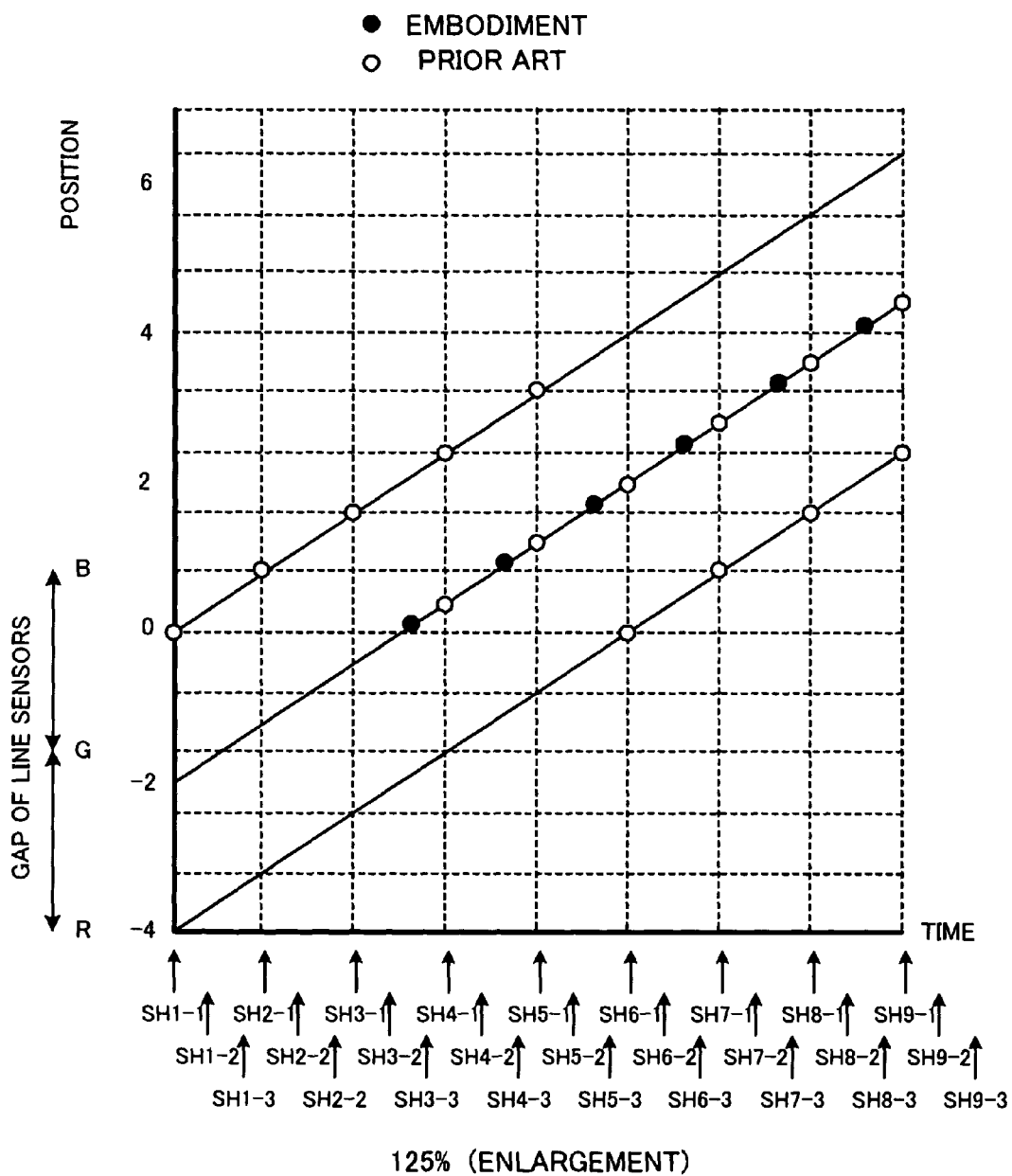
FIG. 9 is a graph showing a relationship between an elapse of time and a position of the line image sensor of when the rate of magnification is 125% in the color image scanning device.
Figure 10:
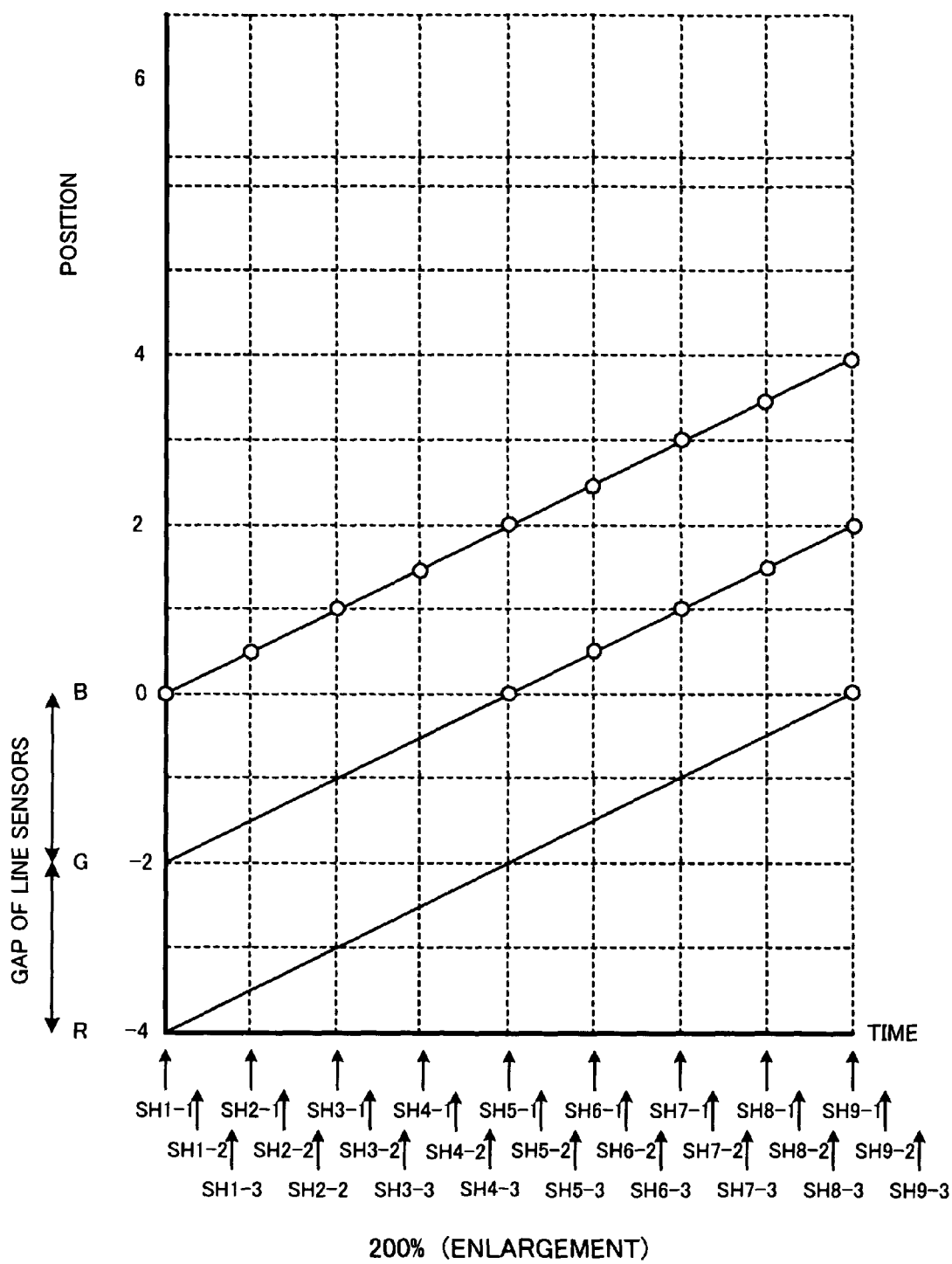
FIG. 10 is a graph showing a relationship between an elapse of time and a position of the line image sensor of when the rate of magnification is 200% in the color image scanning device.

Therefore, as shown in FIG. 6, in relation to the line image sensor 2B, the data scanned by the line image sensor 2R is delayed by five lines, and the data scanned by the line image sensor 2G is delayed by 2.5 lines.

Moreover, since the decimal part d=0, the timing signal SH1 is selected for the timing to write the data scanned by the line image sensor 2R into the line memory 6R, like in the line image sensor 2B. However, since the decimal part d=0.5, the timing signal SH3 is selected for the timing to write the data scanned by the line image sensor 2G into the line memory 6G from the above conditional expression.

Moreover, when the number of lines between the line image sensors R-B is 4, and the number of line between the line image sensors G-B is 2, and the rate of magnification is 200%, between the line image sensors R-B, the number of pixels equals N*m=2.0*4/1=8.0, and (R-B)D(integral part)= 8, and d(decimal part)=0. Moreover, between the line image sensors G-B, the number of pixels equals N*m=2.0*2/ 1=4.0, and (G-B)D(integral part)=4, and d(decimal part)=0.

Therefore, as shown in FIG. 6, in relation to the line image sensor 2B, the data scanned by the line image sensor 2R is delayed by eight lines, and the data scanned by the line image sensor 2G is delayed by four lines. Moreover, since the decimal part d=0 between the line image sensors R-B, and between the line image sensors G-B, the position in the sub scanning direction is not necessary to be corrected. In this case, the timing SH1 is selected for the G signal and the R signal.

Furthermore, when the number of lines between the line image sensors is the same, and the rate of magnification is 50%, between the line image sensors R-B, the number of pixels equals N*m=0.5*4/1=2.0, and (R-B)D(integral part)=2, and d(decimal part)=0. Moreover, between the line image sensors G-B, the number of pixels equals N*m=0.5*2/1=1.0, and (G-B)D(integral part)=1, and d(decimal part)=0.

Therefore, as shown in FIG. 5, in relation to the line image sensor 2B, the data scanned by the line image sensor 2R is delayed by two lines, and the data scanned by the line image sensor 2G is delayed by one line. Moreover, since the decimal part d=0 between the line image sensors R-B and between the line image sensors G-B, the position in the sub scanning direction is not necessary to be corrected. In this case, the timing SH1 is also selected for the G signal and the R signal.

FIG. 7 through FIG. 10 show a relationship between an elapse of time and the positions of each of the line image sensors of when the gap between the line image sensors R-B is four lines, and the gap between the line image sensors G-B is two lines, and the rate of magnification is respectively 50%, 100%, 125%, 200%. Especially when referring to FIG. 9 wherein the rate of magnification is 125%, the R signal, the G signal, and the B signal are output in proximity to the same scanning line more in the present invention wherein the correction is made according to the number of lines, and the lines are further divided for a further correction to be made, than the conventional way wherein the correction is made according to only the number of lines.

What is claimed is:

1. A color image processing device comprising:
   n line sensors which are arranged with a prescribed interval L between one another;
   an image signal output unit which outputs image signals under a prescribed cycle from the line sensors;
   a line memory which stores the image signals for a plurality of lines and outputs the image signals with a delay; and
   a control unit which controls to input one of the image signals of a certain cycle into the line memory, and to output an image signal from the line memory by delaying a certain number of lines, in accordance with a prescribed rate of magnification N,
   wherein when P is a pixel pitch in a sub scanning direction during a scanning operation under 100% magnification, the control unit calculates a number of pixels which increases and decreases by the rate of magnification from N·L/P, determines which cycle is to be selected in accordance with a decimal part d of the calculated number, and determines the number of delayed lines in accordance with an integral part D.

2. The color image processing device according to claim 1, wherein the control unit includes a table of the decimal part d and the selected cycle.

3. The color image processing device according to claim 1, wherein three line sensors are provided to scan an image of a Red (R) component, a Green (G) component, and a Blue (B) component respectively.

4. The color image processing device according to claim 3, further comprising:
   an analog to digital converter which converts analog image signals output from each of the line sensors into digital image signals.

5. A color image processing device comprising:
   means for scanning a line image provided in n-number of rows with a prescribed interval L between one another;
   means for outputting image data from the means for scanning the line image under a prescribed cycle;
   means for storing image data for a plurality of lines and outputting the image data with a delay; and
   means for controlling to realize a prescribed rate of magnification N by inputting image data of a certain cycle into the means for storing, and outputting the image data from the means for storing by delaying a certain number of lines, wherein the prescribed cycle is a prescribed number of times of a cycle in which the image data is output from the means for storing,
   wherein when P is a pixel pitch in a sub scanning direction during a scanning operation under 100% magnification, the means for controlling calculates a number of pixels which increases and decreases by the rate of magnification from N·L/P, determines which cycle is to be selected in accordance with a decimal part d of the calculated number, and determines the number of delayed lines in accordance with an integral part D.

6. The color image processing device according to claim 5, wherein the means for controlling includes a table of the decimal part d and the selected cycle.

7. The color image processing device according to claim 5, wherein three means for scanning are provided to scan image of a Red (R) component, a Green (0) component, and a Blue (B) component respectively.

8. The color image processing device according to claim 7, further comprising:
   means for converting analog image signals output from each of the means for scanning into digital image signals.

9. A color image processing method comprising:
   setting a rate of magnification;
   calculating a number of pixels N·L/P which increases and decreases by the rate of magnification for each of colors in accordance with the rate of magnification and a pixel pitch P in a sub scanning direction during a scanning operation under 100% magnification;
   extracting an integral part D and a decimal part d of the number of pixels N·L/P for each of the colors;
   determining a cycle to output image signals from line sensors for each of the colors in accordance with the decimal part d;
   determining a number of delayed lines in a line memory for each of the colors in accordance with the integral part D; and
   outputting the image signals from each of the line sensors in accordance with the determined cycle, and scanning the image signals of each of the colors from the line memory and outputting a color image signal of an original document in accordance with the determined number of delayed lines.

10. The color image processing method according to claim 9, further comprising:
    selecting one of the colors as a standard;
    calculating the number of pixels N·L/P for the other two colors;
    extracting the integral part D and the decimal part d; and
    determining the cycle and the number of delayed lines.

11. The color image processing device according to claim 1, further comprising shading correction circuitry for correcting shaded data.

12. The color image processing device according to claim 5, further comprising shading correction circuitry for correcting shaded data.

13. The color image processing method according to claim 9, further comprising correcting shaded data.

14. The color image processing device according to claim 1, wherein the rate of magnification is 50%.

15. The color image processing device according to claim 5, wherein the rate of magnification is 50%.

16. The color image processing method according to claim 9, further comprising scanning under a rate of magnification of 50%.

17. The color image processing device according to claim 1, wherein the rate of magnification is 200%.

18. The color image processing device according to claim 5, wherein the rate of magnification is 200%.

* * * * *